E. ALLEN.
Gun-Lock.
No. 60. Reissued January 15, 1844.
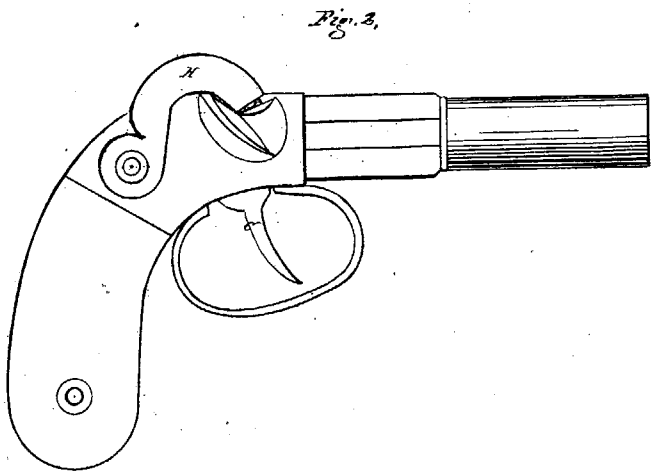
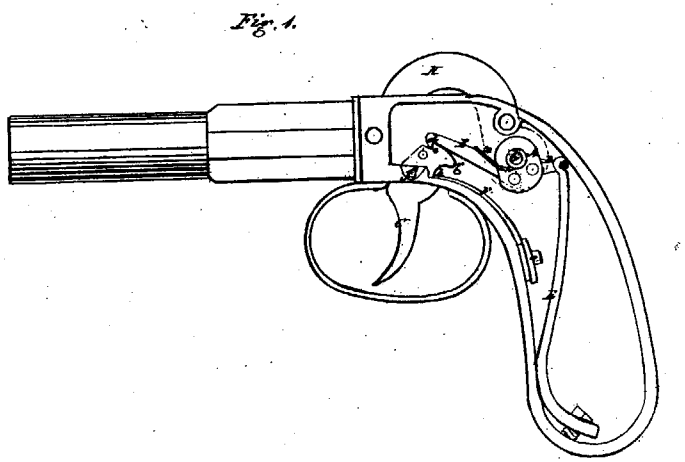
N. PETERS, PHOTO-LITHOGRAPHER, WASHINGTON, D. C.

UNITED STATES PATENT OFFICE.

ETHAN ALLEN, OF GRAFTON, MASSACHUSETTS.

IMPROVEMENT IN THE METHOD OF CONSTRUCTING LOCKS FOR FIRE-ARMS.

Specification forming part of Letters Patent No. 461, dated November 11, 1837; Reissue No. 60, dated January 15, 1844.

*To all whom it may concern:*

Be it known that I, ETHAN ALLEN, late of Grafton, in the county of Worcester and State of Massachusetts, but now of Norwich, in the State of Connecticut, have invented a certain new and useful Improvement in the Locks of Pistols and other Fire-Arms; and I do hereby declare that the following description and accompanying drawings, taken together, constitute a full and exact specification of my invention.

Of the drawings above mentioned, Figure 1 represents the interior of the breech or rear or handle part of a pistol, in which the several members of my improved lock are duly exhibited in their relative positions to each other, while Fig. 2 is an elevation of the opposite side of the pistol, or that on which the percussion hammer or cock is situated.

The cock H, Figs. 1 and 2, is represented in the drawings in its usual position, or as resting upon the nipple I, on which the exploding-cap is placed. It (the cock) is attached in the usual way to the end of one of the journals of a tumbler, A, or to the said tumbler in any convenient and proper manner. That part of the rear side of the tumbler which is just below the journal *b*, on which the tumbler turns, has one end of a small stirrup, D, jointed to it, the other end of the said stirrup being suitably connected to the top or upper part of the mainspring E, arranged as seen in the drawings. The lower part of the anterior or front side of the tumbler has the rear extremity of a dog or catch, B, jointed to it in such manner as to permit the opposite end of the catch to move in a vertical plane when actuated by the trigger C. The front end of the catch has a small acute angular shoulder or hook, *d*, formed upon its lower side, as seen in the drawings, against which (shoulder) a corresponding angular projection, *e*, of the trigger C abuts and operates. The trigger turns on a fulcrum, *f*, in the usual manner, and it is on that part (or the sear) of it above the said fulcrum that the projection *e* is formed, The part *g* of the sear is shaped somewhat in the ordinary manner, or projects a sufficient distance beyond the arc of a circle (struck from the center of the fulcrum *f* as a center and with a radius equal to the distance between the end of the projection *e* and the center of the fulcrum) to bear against the lower side of the catch, and when the trigger is pulled to throw or force the hook *d* entirely above the projection *e* of the trigger. In other words, that part of the upper or rear edge of the sear of the trigger which is in opposition with the lower side of the catch B has a cam shape, so that when the finger is applied to the lower leg or part of the trigger and draws the trigger rearward the catch B will be impelled forward, and as it advances the upper part of the sear will gradually elevate the catch or throw the hook *d* thereof upwardly until it rises above the projection *e* and is retracted by the force of the mainspring E. As the dog or catch B is moved forward by the trigger, it draws upon the lower part of the tumbler and elevates the cock H above the nipple or percussion-cap thereon, and as soon as the catch escapes from the trigger the tumbler is drawn back by the mainspring and the cock thrown down upon the nipple, so as to explode the cap thereon. Thus it will be seen that at each recession of the lower part of the trigger the cock or hammer is raised from and thrown upon the cap; or, in other words, the pistol is cocked and discharged. After each discharge the upper part of the trigger is retracted by means of a spring, F, one end of which is secured to the pistol-frame by a screw, *a*, while the other bears in a notch, *h*, formed in the rear part of the sear of the trigger, or just in rear of the fulcrum thereof. The catch B should be pressed down upon the trigger by the action of a small spring, *x*, applied to it and the tumbler in any convenient manner.

Instead of the catch B being jointed to the tumbler, it may be reversed and jointed directly to the trigger at or near the top thereof, its hooked end being turned upward and acting against a projection (similar to the projection *e*) formed upon the lower part of the tumbler or cock; but as such an arrangement is only a vice versa application of the catch to the tumbler or cock and the trigger, and is substantially the same invention as that first described, I do not deem it necessary to go into a further description thereof.

I do not claim the several parts of the lock separate from each other, as in my surrendered patent; but That which I do claim consists in—

The combination, with the trigger or sear thereof, and the cock or tumbler thereof, of the apparatus by which the cock is elevated from the cap or nipple and discharged or permitted to descend thereon by the force or reaction of the mainspring whenever the trigger is retracted by the finger, the said apparatus consisting of the dog or catch B, jointed or hinged or otherwise suitably applied to the tumbler or cock, or to the trigger, as the case may be, the same being operated by the trigger or by the same and other parts, and constructed substantially in the manner as hereinbefore set forth.

In testimony that the above is a correct specification of my invention I have hereto set my signature this 21st day of October, 1843.

ETHAN ALLEN.

Witnesses:

LA FAYETTE S. FOSTER,
CHAS. THURBER.